(12) United States Patent
Parish

(10) Patent No.: US 8,309,665 B2
(45) Date of Patent: Nov. 13, 2012

(54) AMINE FUNCTIONAL ADDUCTS AND CURABLE COMPOSITIONS COMPRISING SAME

(75) Inventor: David M. Parish, Shaker Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 13/355,627

(22) Filed: Jan. 23, 2012

(65) Prior Publication Data

US 2012/0115986 A1 May 10, 2012

Related U.S. Application Data

(62) Division of application No. 12/198,957, filed on Aug. 27, 2008, now Pat. No. 8,101,690.

(60) Provisional application No. 60/969,250, filed on Aug. 31, 2007.

(51) Int. Cl.
| | |
|---|---|
| *C07C 259/08* | (2006.01) |
| *C08L 63/00* | (2006.01) |
| *C08L 63/04* | (2006.01) |
| *C09D 163/00* | (2006.01) |
| *C09D 163/02* | (2006.01) |
| *B32B 27/38* | (2006.01) |
| *B32B 27/40* | (2006.01) |

(52) U.S. Cl. ............... 525/523; 252/183.11; 428/411.1; 428/413; 428/423.1; 525/453; 525/454; 525/455; 525/502; 525/504; 525/526; 525/528; 525/532; 560/115

(58) Field of Classification Search ................ None
See application file for complete search history.

(56) References Cited

U.S. PATENT DOCUMENTS

| | | | | |
|---|---|---|---|---|
| 4,060,656 A | * | 11/1977 | Naka et al. ............. | 428/355 EP |
| 5,430,112 A | * | 7/1995 | Sakata et al. .................. | 525/526 |
| 2005/0020735 A1 | * | 1/2005 | Krappe et al. ................ | 523/440 |

FOREIGN PATENT DOCUMENTS

FR 2581991 A * 11/1986

* cited by examiner

*Primary Examiner* — Robert Sellers
(74) *Attorney, Agent, or Firm* — Robert E. McDonald; Vivien Y. Tsang; Eryn Ace Fuhrer

(57) ABSTRACT

A multi-component curable composition which is reactive upon admixing of the components and wherein the composition comprises:
  A. a first component which comprises:
    (i) a first amine functional adduct which comprises the reaction product of a stoichiometric excess of a diamine and a compound having an epoxide group and an alpha, beta unsaturated carbonyl group;
  B. a second component which comprises:
    (i) at least one compound having an average of more than 2.0 groups per molecule which are reactive with amines.

16 Claims, No Drawings

AMINE FUNCTIONAL ADDUCTS AND CURABLE COMPOSITIONS COMPRISING SAME

CROSS-REFERENCE TO RELATED APPLICATION

This application is a divisional of U.S. non-provisional patent application Ser. No. 12/198,957 filed on Aug. 27, 2008, now U.S. Pat. No. 8,101,690 issued on Jan. 24, 2012, and which in turn claims the benefit of U.S. provisional patent application No. 60/969,250 filed on Aug. 31, 2007, the entirety of which is hereby incorporated by reference.

This invention relates to an amine functional adduct which comprises the reaction product of a (i) stoichiometric excess of a diamine and (ii) a compound having both an epoxide group and an alpha, beta unsaturated carbonyl group. This invention also relates to curable compositions incorporating that adduct. The amine functional adduct will have an average of at least 2.0 primary or secondary amine groups per molecule, and it can be utilized in a variety of applications such as a chain extender or as a crosslinker with materials reactive with amines such as alpha, beta unsaturated carbonyl compounds, polyepoxides, polyisocyanates, etc.

1. Amine Functional Adduct of a Stoichiometric Excess of a Diamine and a Compound Having an Alpha, Beta Unsaturated Carbonyl Group One aspect of this invention involves the reaction product obtained by the reaction of a stoichiometric excess of a diamine and a compound having both an epoxy group and an alpha, beta unsaturated carbonyl group. In this preparation, the amine groups of the starting diamine will react with the alpha, beta unsaturated carbonyl group via a Michael reaction and also will react by addition with the epoxy group to produce the new amine functional adduct. As used herein with respect to this adduct, the term "stoichiometric excess" means that at least 2.0 amine hydrogens from the starting diamine are present for each equivalent of epoxy and each equivalent of alpha, beta unsaturated carbonyl group combined. For many applications it is useful to utilize more than 2.0 equivalents of amine for each of the combined total number of equivalents of epoxy and alpha, beta unsaturated carbonyl.

For those applications where it is desirable to minimize the molecular weight and viscosity of the final product it is convenient to use a relatively large stoichiometric excess of the diamine starting material and it is convenient to add the compound having the epoxy group and the alpha, beta unsaturation to the diamine. For many such applications it is convenient to use an amount of diamine to provide a ratio of at least 4:1, and for certain applications at least about 5:1, and for certain applications at least about 6:1 and for other applications about 10:1 or higher, of amine equivalents to combined equivalents of epoxy and alpha, beta unsaturated carbonyl groups. For many embodiments of this invention, admixing the components to provide ratios of between about 2:1 to 20:1 of amine equivalents to combined equivalents of epoxy and alpha, beta unsaturated carbonyl groups can be a useful process for preparing the adduct.

The reaction of the diamine and the compound having both an epoxy group and an alpha, beta unsaturated carbonyl group is exothermic and can conveniently be conducted at temperatures ranging from room temperature up to about 170° C. or higher. In one useful process for preparing the adduct, the starting diamine can be heated to about 50-60° C. and the compound having an alpha, beta unsaturated carbonyl group and an epoxy group can be added to the heated amine and maintained at a suitable reaction temperature until the reaction has proceeded to the desired extent. The epoxy/alpha, beta unsaturated carbonyl compound can be added all at once, or in a gradual or dropwise fashion if desired. If desired, the reaction mixture could also include a polymerization inhibitor such as hydroquinone.

The amine-functional adduct reaction product present in the final reaction mixture could be separated from the excess unreacted diamine starting material by conventional separation techniques such as distillation of the remaining unreacted diamine, but in many cases, such as those where the amine-functional adduct will be utilized as a crosslinker or chain extender, it is often practical and cost effective to use the entire final reaction mixture which comprises the amine-functional adduct and the unreacted excess diamine starting material as is without further purification since the unreacted diamine starting material has the same general type of chemical functional group as the adduct product itself, and will also function as a crosslinker, chain extender, or similar reactant in any subsequent reaction. In these situations it is often practical to use very large excesses of the diamine starting material.

Compounds having both an alpha, beta unsaturated carbonyl group, such as (meth)acrylic functionality, and an epoxy group are well known in the art. As used herein, the term "(meth)acryl" is meant to include both acrylic and methacrylic structures. Compounds having both an epoxy group and an alpha, beta unsaturated carbonyl group are readily prepared by the esterification of carboxylated monomers, such as acrylic or methacrylic acid, with glycidol or with epichlorohydrin followed by dehydrohalogenation. Representative compounds include the glycidyl (meth)acrylates, such as glycidyl acrylate and glycidyl methacrylate. Mixtures of more than one of the unsaturated glycidyl compounds can also be utilized.

The diamines which are useful in the production of this adduct can be any diamine having primary and/or secondary amine groups. For some applications, primary diamines are especially useful. Representative diamines include aliphatic diamines such as ethylene diamine, 1,3-diaminopropane, 1,4-diaminobutane, 1,5-diaminopentane, 2-methyl-1,5-diaminopentane, 1,6-diaminohexane, bis(6-aminohexyl)ether, cycloaliphatic diamines such as isophorone diamine, 4,4'-methylene-bis-cyclohexylamine, bis(3-methyl-4-aminocyclohexyl)methane (BMACM), 2,2-bis(3-methyl-4-aminocyclohexyl)propane (BMACP), 2,6-bis(aminomethyl) norbornane (BAMN), and cyclohexane diamine, heterocyclic diamines such as 3,4 diaminofuran and piperazine, and aromatic diamines such as m- or p-phenylenediamine, 2,4- or 2,6-diaminotoluene, and 4,4'diaminodiphenylmethane. In some embodiments it is useful to utilize only non-aromatic amines. In some embodiments, cycloaliphatic diamines are particularly useful. Mixtures of more than one diamine can also be utilized.

For some embodiments it is preferred that the amine-functional adduct itself would have a number average molecular weight less than about 1500, or less than 1000, or less than 900, or less than 800, or less than 700, or less than 500 to provide products having relatively low viscosities.

2. Curable Compositions Comprising the Amine-Functional Adduct

In a further embodiment of this invention, the amine-functional adduct prepared as the reaction product of a stoichiometric excess of a diamine and a compound having an epoxide group and an alpha, beta unsaturated carbonyl group can be utilized in multi-component curable compositions wherein the components are reactive upon admixing the components, and wherein the first component comprises this adduct, optionally in combination with one or more other polyamines, including other polyamine adducts, and the second component comprises at least one compound having an average of at least, and for some applications more than, 2.0 groups per molecule which are reactive with amines. These reactive groups representatively would include, for example, epoxy, alpha, beta unsaturated carbonyl groups and isocyanate groups. In some embodiments it is useful to utilize compounds having epoxy groups and/or compounds having alpha, beta unsaturated carbonyl groups in the curable compositions.

In an additional embodiment, this invention relates to a multi-component curable composition which is reactive upon admixing of the components and wherein the composition comprises:

A. a first component which comprises:
  (i) an amine-functional adduct which comprises the reaction product of a stoichiometric excess of a diamine and a compound having both an epoxide group and an alpha, beta unsaturated carbonyl group;
  (ii) optionally, at least one additional polyamine having an average of at least 2.0 primary or secondary amine groups per molecule; and
B. a second component which comprises at least one compound having an average of at least, and for some applications more than, 2.0 groups per molecule which are reactive with amines.

In another embodiment, this invention relates to a multi-component curable composition which is reactive upon admixing of the components and wherein the composition comprises:

A. a first component which comprises:
  (i) a first amine functional adduct which comprises the reaction product of a stoichiometric excess of a first diamine and a compound having an epoxide group and an alpha, beta unsaturated carbonyl group; and
  (ii) a second amine functional adduct which comprises the reaction product of a stoichiometric excess of a second diamine and a polyepoxide having an average of at least 2.0 epoxy groups per molecule; and
  (iii) optionally, an additional polyamine having an average of at least 2.0 primary or secondary amine groups per molecule; and
B. a second component which comprises:
  (i) at least one polyepoxide having an average of at least 2.0 epoxy groups per molecule; and
  (ii) at least one poly (meth)acrylate having an average of at least 2.0 (meth)acrylate groups per molecule;
and wherein the first diamine and the second diamine may be the same or different.

2. (a) Amine Functional Adduct of a Stoichiometric Excess of a Diamine and a Polyepoxide In some embodiments of the curable compositions of this invention it is useful to incorporate a second amine-functional adduct to be used in combination with the first amine-functional adduct described in Section 1. One useful second amine-functional adduct comprises the reaction product of a stoichiometric excess of a diamine and a polyepoxide having an average of at least 2.0 epoxy groups per molecule. As used herein, with respect to this adduct, the term "stoichiometric excess" means that at least 2.0 amine hydrogens from the starting diamine are present for each equivalent of epoxy in the polyepoxide. For many applications it is useful to utilize more than 2.0 equivalents of amine for each equivalent of epoxy to prepare the adduct. For many applications, such as those where it is desirable to minimize the molecular weight and viscosity of the final product, it is convenient to use a relatively large stoichiometric excess of the diamine starting material. In some embodiments of this invention, it can be useful to incorporate at least about 5.0 and sometimes at least about 10.0, and sometimes at least about 15.0, and sometimes at least about 20.0, and sometimes at least about 25.0, and sometimes at least about 30.0 equivalents of amine for each equivalent of epoxy in the preparation of this second amine functional adduct. The very high excess of amine functionality can help to minimize the molecular weight and viscosity of the final product.

In one useful process for preparing the adduct, the starting diamine can be heated to about 50-60° C. and the polyepoxide can be added to the heated amine and maintained at a suitable reaction temperature until the reaction has proceeded to the desired extent. The polyepoxide can be added all at once, or in a gradual or dropwise fashion if desired. If desired, the reaction mixture could also include a polymerization inhibitor such as hydroquinone.

The reaction of the diamine and the polyepoxide is exothermic and can conveniently be conducted at temperatures ranging up to about 170° C. or higher. The amine-functional adduct reaction product could be separated from the excess unreacted diamine starting material by conventional separation techniques such as distillation, but in many cases, such as those where the amine-functional adduct will be utilized as a crosslinker or chain extender, it is often practical and cost effective to use the entire reaction mixture which comprises the amine-functional adduct and the unreacted excess diamine starting material as is without further purification since the unreacted diamine starting material has the same general type of chemical functional group as the adduct product itself, and will also function as a crosslinker, chain extender, or similar reactant in any subsequent reaction.

The diamine which is useful in the preparation of this second amine-functional adduct can be any diamine having primary and/or secondary amine groups. The representative diamines taught for the first amine-functional adduct of Section 1 hereof, are also representative of diamines that might be utilized in the production of this second adduct. For some applications, cycloaliphatic diamines are useful. The polyepoxides which are useful in the preparation of this second adduct should have an average of at least 2.0 epoxy groups per molecule. For some embodiments it is useful to select a polyepoxide having an average of between about 2.0 and about 4.0 epoxy groups per molecule.

Representative polyepoxides useful in the preparation of the second adduct can be any polyepoxide having an average of at least 2.0 epoxy groups per molecule and include the glycidyl ethers of aliphatic or aromatic diols or polyols such as the polyepoxy functional novolac, bisphenol and aliphatic and cycloaliphatic epoxies. Some specific examples of useful polyepoxides include butanediol diglycidyl ether, neopentylglycol diglycidyl ether, diglycidyl 1,2-cyclohexanedicarboxylate, poly(propylene glycol) diglycidyl ether, resorcinol diglycidyl ether, triglycidyl ethers of glycerin, triglycidyl isocyanurate, trimethylolpropane triglycidyl ether, novolac epoxy resins, bisphenol A epoxy resins, etc. Polyglycidyl ethers are well known in the art and can be conveniently prepared by the reaction of an epihalohydrin, such as epichlorohydrin, with a compound having at least two hydroxyl groups, such as an aliphatic or cycloaliphatic polyol or a polyhydric phenol. Other polyepoxides include the glycidyl esters, such as those typically obtained by the reaction of polycarboxylic acids with epihalohydrins and alkali metal hydroxides. Epoxy novolac resins are useful in some embodiments of this invention, and are representatively prepared by reacting an epihalohydrin with the condensation product of an aldehyde with a polyhydric phenol.

Polyepoxides can also be prepared by the polymerization of unsaturated epoxy functional monomers such as glycidyl acrylate with other unsaturated monomers. For some embodiments of this invention, aliphatic polyepoxides and/or epoxy novolacs are useful.

2. (b) Optional Additional Polyamines

For some embodiments of the curable compositions of this invention it may be useful to also incorporate additional polyamines having primary and/or secondary amine groups. Frequently it is practical to incorporate additional polyamines into the first component of the curable composition by utilizing the unpurified reaction mixture from the production of the first amine adduct and the second amine adduct, since the remaining unreacted diamine starting material will be capable of reacting as a polyamine. Other diamines, such as those taught for use in the production of the adducts themselves, can be incorporated. For some embodiments of the curable compositions it is useful to incorporate at least some polyamines having an average of more than 2.0 primary or secondary amine groups per molecule to provide greater branching or crosslinking to the system.

Representative polyamines having an average of more than 2.0 amine groups per molecule include diethylenetriamine, N,N'-dimethyldiethyltriamine, cyclohexyl-1,2,4-triamine, triethylenetetramine, cyclohexyl-1,2,4,5-tetramine, tetramethylenepentamine, etc. Polyamines can also be prepared by methods well known in the art such as by the polymerization of acrylic or other unsaturated monomers having primary or secondary amine functionality, or by the reaction of amines having at least two primary amine groups per molecule with a polycarboxylic acid to form polyamide amines. Other polyamines such as the Jeffamine® polyoxypropyleneamines available from Huntsman Chemicals, Inc. are also practical. Mixtures of two or more additional polyamines can also be utilized. For some embodiments of this invention, aliphatic and cycloaliphatic amines are useful due to some of their properties such as clarity and resistance to yellowing.

The first amine adduct and optionally the second amine adduct and optionally the additional polyamines will typically comprise one component of a multicomponent curable composition. The second component of the multicomponent composition will comprise at least one compound having an average of at least, and for some applications more than, 2.0 groups per molecule which are reactive with amines, such as polyepoxides, poly(meth)acrylates or polyisocyanates, or mixtures thereof.

2. (c) Polyepoxide Compounds

Polyepoxide compounds which are useful in the curable compositions of this invention can include any polyepoxide having an average of at least 2.0 epoxy groups per molecule. Polyepoxides are well known in the art and the polyepoxides listed in Section 2(a) above are also representative examples of some of the polyepoxides that can be utilized in the curable compositions of this invention. Mixtures of more than one polyepoxide are also practical.

2. (d) Poly(meth)acrylate Compounds

It is also useful in some embodiments of the curable compositions of this invention to incorporate compounds having an average of at least 2.0 (meth)acrylate or other alpha, beta unsaturated carbonyl groups which are capable of Michael-type reactions with amines. Poly(meth)acrylate compounds are well known in the art and can be conveniently prepared by a variety of methods. Suitable unsaturated esters can be prepared by reacting acrylic acid or methacrylic acid with polyhydric alcohols such as ethylene glycol, 1,2- and 1,3- propylene glycol, 1,4-butanediol, neopentyl glycol, 2-methyl-1,5-pentanediol, dimethylolcyclohexane, glycerol, trimethylolpropane, pentaerythritol, dipentaerythritol, etc. Also, the polyhydric alcohols could be converted into ether alcohols of higher molecular weights by alkoxylation with a monoepoxide such as propylene oxide or ethylene oxide prior to reaction with the unsaturated acids. Representative useful compounds having an average of at least 2.0 alpha, beta unsaturated carbonyl groups include polyethylene glycol di(meth)acrylate, 1,3-butylene glycol di(meth)acrylate, 1,4-butanediol di(meth)acrylate, 1,6-hexanediol di(meth)acrylate, neopentyl glycol di(meth)acrylate, ethoxylated bisphenol A di(meth)acrylate, trimethylol propane tri(meth)acrylate, tris (2-hydroxyethyl)isocyanurate trimethacrylate, pentaerythritol tri(meth)acrylate, and dipentaerythritol penta(meth)acrylate. Mixtures of compounds having at least 2.0 alpha, beta unsaturated groups are also practical. For some embodiments it is useful to utilize both a difunctional compound and also a compound having more than two alpha, beta unsaturated carbonyl groups. For some embodiments of the curable compositions, acrylates are preferred over methacrylates due to their relatively faster reaction rates.

2. (e) Polyisocyanate Compounds

Polyisocyanates can also be useful in reacting with the amine functional adducts. Polyiscocyanates useful in the compositions of this invention have an average of at least two isocyanate groups per molecule. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages.

In those embodiments where the first component comprises the first amine adduct and any additional amines and/or amine adducts, and the second component comprises a polyisocyanate, the ratio of equivalents of isocyanate to active hydrogen in the first component can be widely varied within the practice of this invention. In such a formulation the polyisocyanate will typically be present at a level to provide at least about 0.3, and for some applications about 0.5 to about 2.0, and for some applications about 0.7 to about 1.3 equivalents of isocyanate for each equivalent of active hydrogen.

In one embodiment, the multi-component curable compositions will comprise a first component, comprising the first amine adduct and any additional amines and/or amine adducts, and a second component, comprising the materials reactive with amines such as the polyepoxide, and/or the alpha, beta unsaturated carbonyl compounds. These curable compositions would typically be admixed in amounts to provide an equivalents ratio of amine equivalents to equivalents of groups reactive with amines of at least about 0.3 and for some applications at least about 0.5, and for some applications at least about 0.9 and in some cases at least about 1.0 and in some embodiments at least about 1.5, and in some cases at least about 2.0 for each equivalent of groups reactive with amines. The relative weight ratios of the first amine adduct and the optional second amine adduct and the optional additional polyamines can vary widely within the practice of this invention. For some embodiments the relative weight ratios would be from 0.1 to 100% of the first amine functional adduct, from 0.0 to 99.9% of the optional second amine functional adduct, and from 0.0 to 99.9% of any additional polyamines. In one embodiment of the curable compositions of this invention, useful weight ratios would be from 1.0 to 97% of the first amine functional adduct, 1.0 to 97% of the second amine functional adduct and 1.0 to 97% of any additional polyamines. In another embodiment, useful relative weight ratios would be 3.0 to 35% of the first amine functional adduct, 3.0 to 35% of the second amine functional adduct, and 30 to 94% of the additional polyamines.

Similarly, the relative weight ratios of the polyepoxides and the poly(meth)acrylate compounds which are used in some of the curable compositions can vary widely if both are used. For some embodiments, the relative weight ratios would be from 0.1% to 99.9% of the polyepoxides and from 0.1 to 99.9% of the poly(meth)acrylate compounds. In another embodiment of the curable compositions, the relative weight ratios would be from 5.0% to 65.0% poly(meth)acrylate and 35% to 95% polyepoxide. In another embodiment the relative weight ratios would be from 10% to 40% of the poly(meth)acrylate and 60% to 90% polyepoxide.

The curable compositions of this invention are reactive upon mixing and can typically be cured at temperatures ranging from about room temperature up to about 175° C. or higher. For many applications it is useful to allow the composition to cure at room temperature.

When the curable compositions are utilized as coatings, the coatings can be clear coatings or they may contain pigments or dyes as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, barites, talc, etc.

The coatings may also contain other additives such as flow agents, catalysts, diluents, solvents, ultraviolet light absorbers and stabilizers, flexibilizers, and adhesion promoters.

Since the curable compositions of this invention are typically provided as multi-package systems which must be mixed together prior to use, the pigments, catalysts and other additives can be conveniently added to any or all of the appropriate individual packages. The curable compositions of the invention may typically be applied to any substrate such as concrete, asphalt, metal, plastic, wood, glass, synthetic fibers, etc. by brushing, dipping, roll coating, squeegee, flow coating, spraying, in-mold coating, or other method conventionally employed in the coating industry.

In one embodiment of this invention, the curable composition of this invention can be utilized as a curable flooring material. In this application, the curable composition can be applied as a very high solids material and will cure very quickly, sometimes allowing a multi-coat application which will cure sufficiently to walk on within twelve hours or less at room temperature. In such an application, it is typical to apply an initial coat to a concrete or other floor substrate. For many applications the curable coating is poured onto the floor and spread with a squeegee or other applicator to achieve a wet film thickness of between about 15 to 35, and typically 20 to about 30, mils. This application can then be followed by the optional broadcast of solid decorative and/or protective materials such as colored pigments, metallic flakes, glass beads, fluorescent particles, garnet, slip resistant particles or other materials onto the wet surface of the coating before it is completely cured. This initial layer is allowed to cure or dry for several hours and the process can be repeated with one or more additional coating layers applied thereto, optionally followed by another broadcast of coloring material. Finally, a clear coat may be applied to that surface and allowed to dry. Due to the extremely fast cure of the curable coatings of this invention it is possible to complete such a multicoat application and walk on the cured coating in less than 24 hours, and frequently in less than about 12 hours.

The following examples have been selected to illustrate specific embodiments and practices of advantage to a more complete understanding of the invention. Unless otherwise stated, "parts" means parts-by-weight and "percent" is percent-by-weight, equivalent weight is on a weight solids basis, and molecular weight is number average molecular weight as determined relative to polystyrene standards. As used herein, the term "reaction mixture" includes both the reaction product adduct and the unreacted starting materials such as any unreacted stoichiometric excess of diamine starting material.

EXAMPLE 1

Preparation of an Amine Functional Adduct Comprising the Reaction Product of a Stoichiometric Excess of a Diamine and a Monomer Having an Alpha, Beta Unsaturated Carbonyl Group and an Epoxide Group A reaction vessel equipped with an agitator, addition funnel and condenser was charged with 1000 parts (approximately 19.05 equivalents) of PACM (4,4'-methylene-bis-cyclohexylamine) which had been preheated to 50° C. The temperature was increased to 62° C. and 200 parts (approximately 2.82 equivalents) of GMA (glycidyl methacrylate) was added to the reaction vessel and agitated. The agitation was continued and the external heat was turned off. The mixture was allowed to exotherm to about 115 to 120° C. The mixture was maintained under agitation for about 50 minutes and then the temperature was increased to about 145° C. and maintained at that temperature for about 30 minutes. The reaction mixture comprising the amine functional adduct reaction product and the unreacted starting material was then allowed to cool.

EXAMPLE 2

Preparation of an Amine Functional Adduct Comprising the Reaction Product of a Stoichiometric Excess of a Diamine and a Polyepoxide A reaction vessel equipped with an agitator, additional funnel and condenser was charged with 1000 parts (approximately 23.5 equivalents) of IPDA (isophorone diamine) which had been preheated to 60° C. 200 parts (approximately 1.2 equivalents) of CVC 8240 (Novolac epoxy resin from CVC Specialty Chemicals Inc. having an epoxide equivalent weight of approximately 170) was added to the reaction vessel and agitated. The mixture was allowed to exotherm to about 108 to 112° C. The mixture was maintained under agitation for about 40 minutes and then the temperature was increased to about 150° C. and maintained at that temperature for about 30 minutes. The reaction mixture comprising the amine functional adduct reaction product and the unreacted starting material was then allowed to cool.

EXAMPLE 3

Preparation of Blends of Amine Functional Materials as a First Component

The reaction mixtures of Examples 1 and 2 (1,200 parts of each) were blended together. Triethylenetetramine (TETA, 243.77 parts) was added to this mixture under agitation and allowed to slowly blend in for 5 minutes. Benzyl alcohol (32.11 parts) was then added and mixed. This total mixture equates to 44.85% by weight of each of the reaction mixtures of Examples 1 and 2, 9.11% TETA, and 1.20% benzyl alcohol.

EXAMPLE 4

Preparation of Second Component

A blend was prepared by admixing neopentyl glycol diglycidyl ether (42.94 parts), trimethylolpropane triglycidyl ether (32.24 parts), trimethylolpropane triacrylate (22.43 parts), polymethyl siloxane defoamer (0.16 parts), polyether modified poly-dimethyl-siloxane flow agent (1.13 parts), and bis(1,2,2,6,6-pentamethyl-4-piperidinyl)-sebacate light stabilizer (1.09 parts).

EXAMPLE 5

Preparation of a Curable Composition

A curable composition was prepared by admixing one volume portion of the first component prepared as described in Example 3 (amine portion) and two volume portions of the second component prepared as described in Example 4 (epoxy and poly(meth)acrylate portion). This provides an equivalent ratio of approximately 1.03 amine equivalents for each equivalent of alpha, beta unsaturated carbonyl and epoxy. When applied to a substrate and allowed to cure the curable composition reacts quickly to form a hard, resistant cured film.

While this invention has been described by a specific number of embodiments, other variations and modifications may be made without departing from the spirit and scope of the invention as set forth in the appended claims.

The entire disclosure of all applications, patents and publications cited herein are hereby incorporated by reference.

The invention claimed is:

1. A multi-component curable composition which is reactive upon admixing of the components and wherein the composition comprises:
A. a first component which comprises:
(i) a first amine functional adduct which comprises the reaction product of a stoichiometric excess of a diamine and a compound having an epoxide group and an alpha, beta unsaturated carbonyl group and wherein the amine groups of the diamine react with both the epoxide group and the alpha, beta unsaturated carbonyl group of the compound;
B. a second component which comprises:
(i) at least one compound having an average of at least 2.0 groups per molecule which are reactive with amines.

2. The composition of claim 1 wherein the first amine functional adduct comprises the reaction product of a stoichiometric excess of a diamine and glycidyl (meth)acrylate.

3. The composition of claim 1 wherein the diamine comprises a cycloaliphatic diamine.

4. The composition of claim 1 wherein the diamine comprises 4,4'-methylene-bis-cyclohexylamine.

5. The composition of claim 1 wherein the first amine functional adduct has a number average molecular weight less than about 1,500.

6. The composition of claim 1 wherein the first amine functional adduct is the reaction product obtained by admixing the diamine and the compound having an epoxide group and an alpha beta unsaturated carbonyl at amounts to provide at least 4.0 equivalents of amine for each equivalent of epoxy and of alpha, beta unsaturated carbonyl combined.

7. The composition of claim 1 wherein the first component also comprises at least one additional polyamine having an average of at least 2.0 primary or secondary amine groups per molecule.

8. The composition of claim 1 wherein the at least one compound having an average of at least 2.0 groups per molecule which are reactive with amines comprises a polyepoxide.

9. The composition of claim 1 wherein the at least one compound having an average of at least 2.0 groups per molecule which are reactive with amines comprises at least one poly (meth)acrylate having an average of at least 2.0 (meth) acrylate groups per molecule.

10. The composition of claim 9 wherein the at least one poly (meth)acrylate comprises a tri (meth)acrylate.

11. The composition of claim 1 wherein the first component and the second component are present in an amount to provide a ratio of amine equivalents to equivalents of compounds reactive with amines of at least 0.9:1.

12. The composition of claim 1 wherein the first component and the second component are present in an amount to provide a ratio of amine equivalents to equivalents of compounds reactive with amines of at least 1:1.

13. The composition of claim 1 wherein the first component and the second component are present in an amount to provide a ratio of amine equivalents to equivalents of compounds reactive with amines of between 1:1 to about 1.5:1.

14. The composition of claim 1 wherein the at least one compound having an average of at least 2.0 groups per molecule which are reactive with amines comprises a polyisocyanate.

15. The composition of claim 1 wherein the at least one compound having an average of at least 2.0 groups per molecule which are reactive with amines has an average of more than 2.0 groups per molecule which are reactive with amines.

16. A substrate coated with the curable composition of claim 1.

* * * * *